United States Patent [19]
Feller

[11] Patent Number: 6,094,846
[45] Date of Patent: Aug. 1, 2000

[54] SINGLE WHEEL CASTER APPARATUS

[75] Inventor: Richard L. Feller, Monroe, Wis.

[73] Assignee: Monroe Truck Equipment Inc., Monroe, Wis.

[21] Appl. No.: 09/435,493

[22] Filed: Nov. 6, 1999

Related U.S. Application Data

[63] Continuation of application No. 09/037,626, Mar. 10, 1998.

[51] Int. Cl.⁷ .............................. B60B 33/00; E01H 5/06; F16L 19/04
[52] U.S. Cl. ............................. 37/270; 16/35 D; 384/490
[58] Field of Search ............................. 37/270; 16/35 D; 384/490

[56] References Cited

U.S. PATENT DOCUMENTS

| | | | |
|---|---|---|---|
| Re. 23,459 | 2/1952 | Budnick et al. | 16/35 D |
| 1,786,974 | 12/1930 | Abbe | 37/270 |
| 4,028,773 | 6/1977 | Morgan | 16/35 R |
| 4,178,007 | 12/1979 | Martineau | 280/80 R |
| 4,205,413 | 6/1980 | Collignon et al. | 16/35 D |
| 4,259,794 | 4/1981 | Rath | 37/270 |
| 4,280,246 | 7/1981 | Christensen | 16/35 D |
| 4,905,387 | 3/1990 | Street | 37/271 |
| 5,072,960 | 12/1991 | Sperko | 280/47.34 |
| 5,214,823 | 6/1993 | Screen | 16/35 D |
| 5,303,450 | 4/1994 | Lange | 16/35 D |
| 5,355,664 | 10/1994 | Zenner | 56/15.8 |
| 5,806,214 | 9/1998 | Behrens et al. | 37/231 |

*Primary Examiner*—Eileen Dunn Lillis
*Assistant Examiner*—Gary S. Hartmann
*Attorney, Agent, or Firm*—David J. Archer

[57] ABSTRACT

A single wheel caster apparatus is disclosed for supporting a plow. The apparatus includes a wheel and an axle, the axle extending through the wheel such that the wheel is rotatably supported by the axle. Additionally, a first and a second fork are provided with each fork having a proximal and a distal end. A head which defines a plurality of detents is rigidly secured to a cross member and extends therefrom in a direction away from the wheel. A tube has a first and second extremity and defines a bore for the reception therein of the head. The tube defines a first radial passageway which is disposed in the vicinity of the detents. A flexible tubular lining is disposed within the bore of the tube. A first member is slidably disposed within the first passageway with the first member being disposed adjacent to the lining such that the lining is located between the first member and one of the detents. Also, a first spring is disposed within the first passageway for biasing the first member towards the one of the detents, the arrangement being such that an interaction of the first member with the lining permits controlled relative rotation of the head within the tube so that when the wheel rotates about the axle, wobble of the wheel and the forks is inhibited, while the interaction permits rotation of the forks relative to the tube during turning and reversing of the plow.

20 Claims, 12 Drawing Sheets

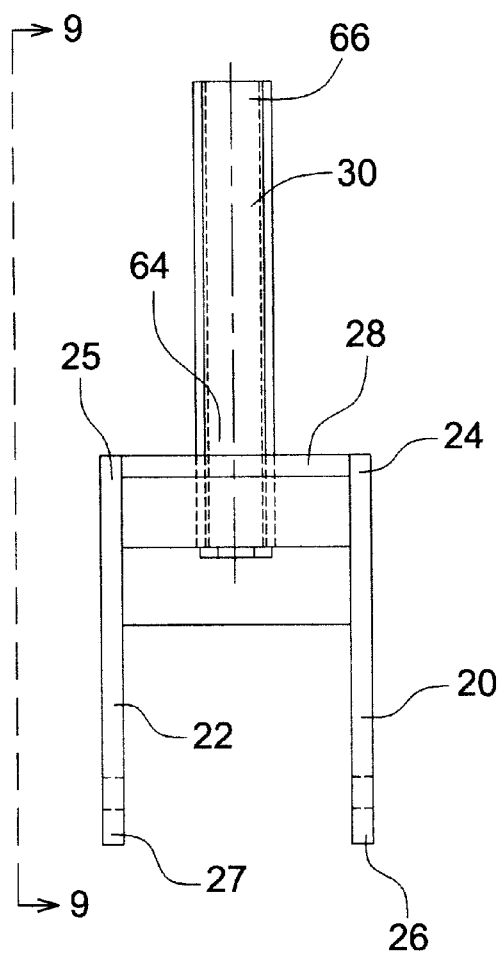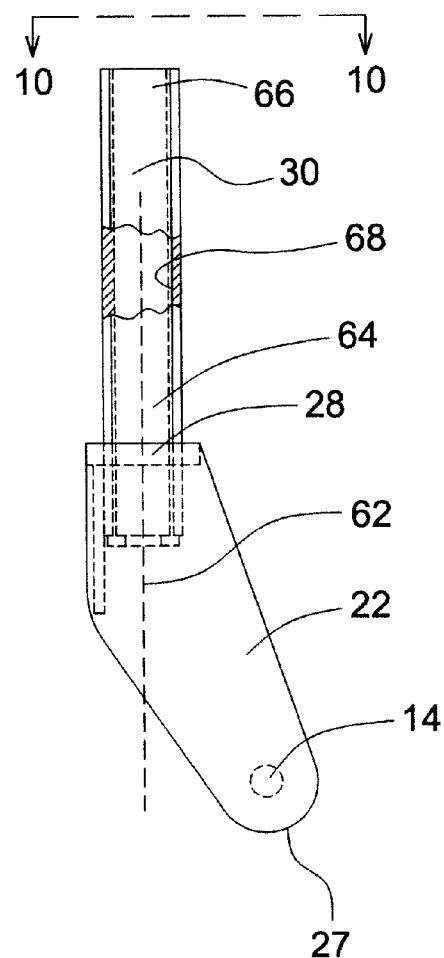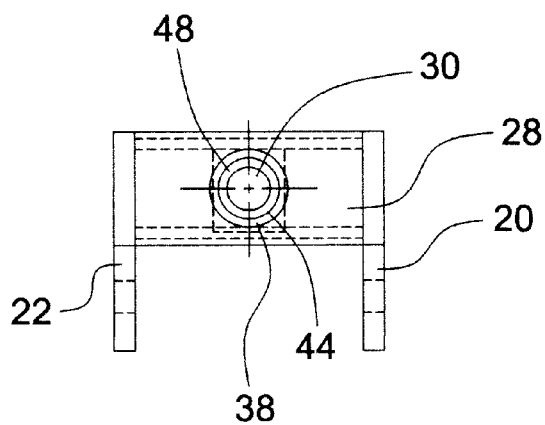

SINGLE WHEEL CASTER APPARATUS

CROSS REFERENCE TO RELATED APPLICATION

The present application is a continuation in part of U.S. Ser. No. 09/037,626 filed Mar. 10th 1998. All the subject matter of the aforementioned U.S. Ser. No. 09/037,626 is incorporated herein by reference

BACKGROUND OF THE INVENTION

1. Field of the Invention

The present invention relates to a single wheel caster apparatus for supporting a plow for maintaining an airport runway.

More specifically, the present invention relates to a single wheel caster apparatus for an airport plow for removing snow and ice from a runway.

2. Information Disclosure Statement

Many international airports cater to over a million passengers a year and every effort is made to maintain air transportation even under inclement weather conditions.

Accordingly, airports are supplied with airport plows for removing snow and ice from runways.

Usually an airport plow is mounted to the front of a massive truck or tractor, such plows having a width of as much as 35 ft. The plow is capable of being offset or reversed relative to the truck so that as the truck and plow combination move along the runway, snow and ice are lifted from the runway and ejected sideways from the path of travel.

Because of the considerable weight of the plow, dual wheel casters have been provided adjacent to each side of the plow for supporting the moldboard and ancillary framework.

In the prior art airport plows as stated hereinbefore, a dual wheel caster has been secured to each end of the base of the plow apparatus. However, in each caster, the dual wheels actually share the same vertical pivot axis which extends between the respective tires. Also, the dual wheels are designed to rotate through 360 degrees about such vertical axis with the axles or more usually the common axle of the dual wheels moving through a horizontal plane. Accordingly, such movement of the axle or axles creates a strong tendency for the prior art dual wheel casters to severely wobble during movement thereof. Such wobbling of the dual wheels occurs because as the load to one of the wheel changes, the other wheel over corrects and the process repeats itself. Therefore, after a limited amount of operational time, the dual wheel wobble causes excessive wear to the tires and rapid failure thereof.

The present invention overcomes the aforementioned wheel wobble syndrome by the provision of a unique single wheel caster arrangement in which the entire weight of the apparatus is supported by means of single wheel casters disposed adjacent to the lateral sides of the plow.

Therefore, a primary objective of the present invention is to provide a single wheel caster apparatus for an airport plow that overcomes the aforementioned problems associated with the prior art arrangements and which makes a considerable contribution to the art of maintaining airport runways.

Another object of the present invention is the provision of a single wheel caster apparatus supported by a pair of forks which rotate relative to a tube having a spring detent mechanism therein for controlling wobble of the wheel while permitting reversing of the plow.

Other objects and advantages of the present invention will be readily apparent to those skilled in the art by a consideration of the detailed description contained hereinafter taken in conjunction with the annexed drawings.

SUMMARY OF THE INVENTION

The present invention relates to a single wheel caster apparatus for supporting a plow. The apparatus includes a wheel supported by an axle having a first and a second end, the axle extending through the wheel such that the wheel is rotatably supported by the axle. Additionally, a first and a second fork are provided with each fork having a proximal and a distal end. The distal end of the first fork supports the first end of the axle while the distal end of the second fork supports the second end of the axle. A cross member extends between the proximal ends of the forks and a head is rigidly secured to the cross member and extends therefrom in a direction away from the wheel. The head defines a plurality of detents. A tube has a first and second extremity and defines a bore which extends between the extremities for the reception therein of the head. The tube defines a first radial passageway which is disposed in the vicinity of the detents. A flexible tubular lining is disposed within the bore of the tube, the lining being disposed between the tube and the head. A first member is slidably disposed within the first passageway with the first member being located adjacent to the lining such that the lining is positioned between the first member and one of the detents. Also, a first spring is disposed within the first passageway for biasing the first member towards the one of the detents. The arrangement is such that an interaction of the first member with the lining permits controlled relative rotation of the head within the tube so that when the wheel rotates about the axle, wobble of the wheel and the forks is inhibited, while the interaction permits rotation of the forks relative to the tube during turning and reversing of the plow.

Many modifications and variations of the present inventions will be readily apparent to those skilled in the art by a consideration of the detailed description contained hereinafter taken in conjunction with the annexed drawings.

However, such modifications and variations fall within the spirit and scope of the present invention as defined by the appended claims.

Included in such modifications would be the provision of any type of airport plow regardless of the construction thereof.

BRIEF DESCRIPTION OF THE DRAWINGS

FIG. 8 is an enlarged front elevational view of the forks shown in FIG. 3;

FIG. 9 is a view taken on the line 9—9 of FIG. 8;

FIG. 10 is a view taken on the line 10—10 of FIG. 9;

Similar reference characters refer to similar parts throughout the various views of the drawings.

DETAILED DESCRIPTION OF THE DRAWINGS

Figure 1:
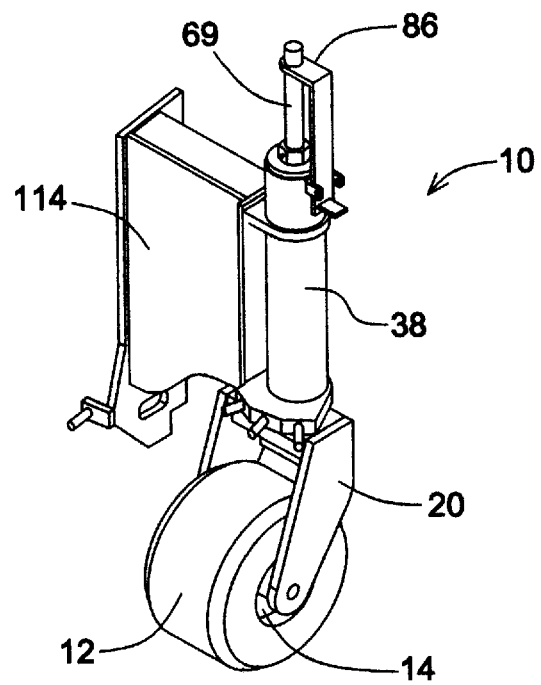
FIG. 1 is as perspective view of a single wheel caster apparatus according to the present invention.

FIG. 1 is a perspective view of a single wheel caster apparatus generally designated 10 according to the present invention, the apparatus 10 being used for supporting an airport plow (not shown). The apparatus 10 includes a wheel 12 and an axle 14.

Figure 2:
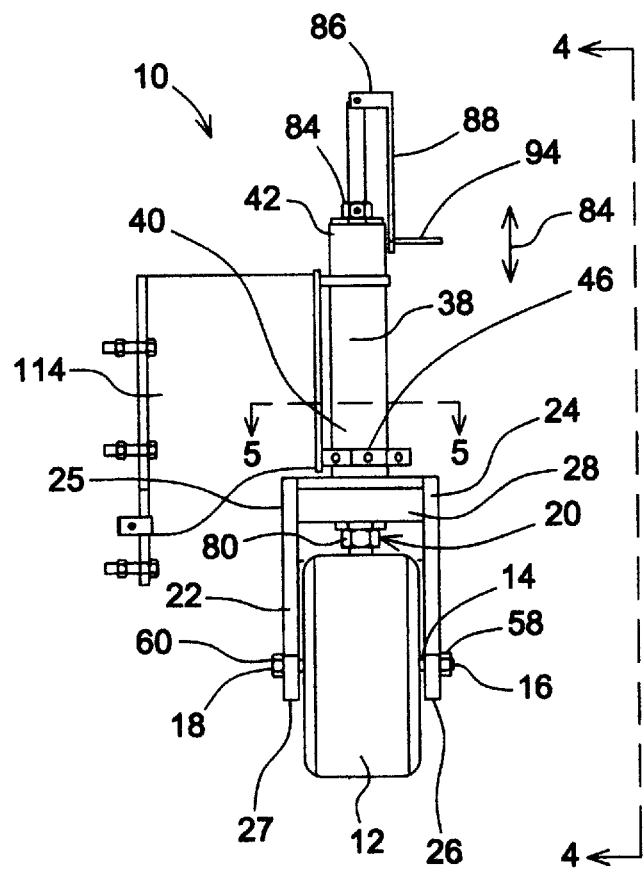
FIG. 2 is an enlarged front elevational view of the apparatus shown in FIG. 1.

FIG. 2 is an enlarged front elevational view of the apparatus 10 shown in FIG. 1. FIG. 2 shows the axle 14 in the form of a bolt having a first and a second end 16 and 18 respectively, the axle 14 extending through the wheel 12 such that the wheel 12 is rotatably supported by the axle 14. Additionally, the apparatus 10 includes a first and a second fork 20 and 22 respectively, with each fork 20 and 22 respectively having a proximal and a distal end 24, 26 and 25,27 respectively. The distal end 26 of the first fork 20 supports the first end 16 of the axle 14 while the distal end 27 of the second fork 22 supports the second end 18 of the axle 14. A cross member 28 extends between the proximal ends 24 and 25 respectively of the forks 20 and 22.

Figure 3:
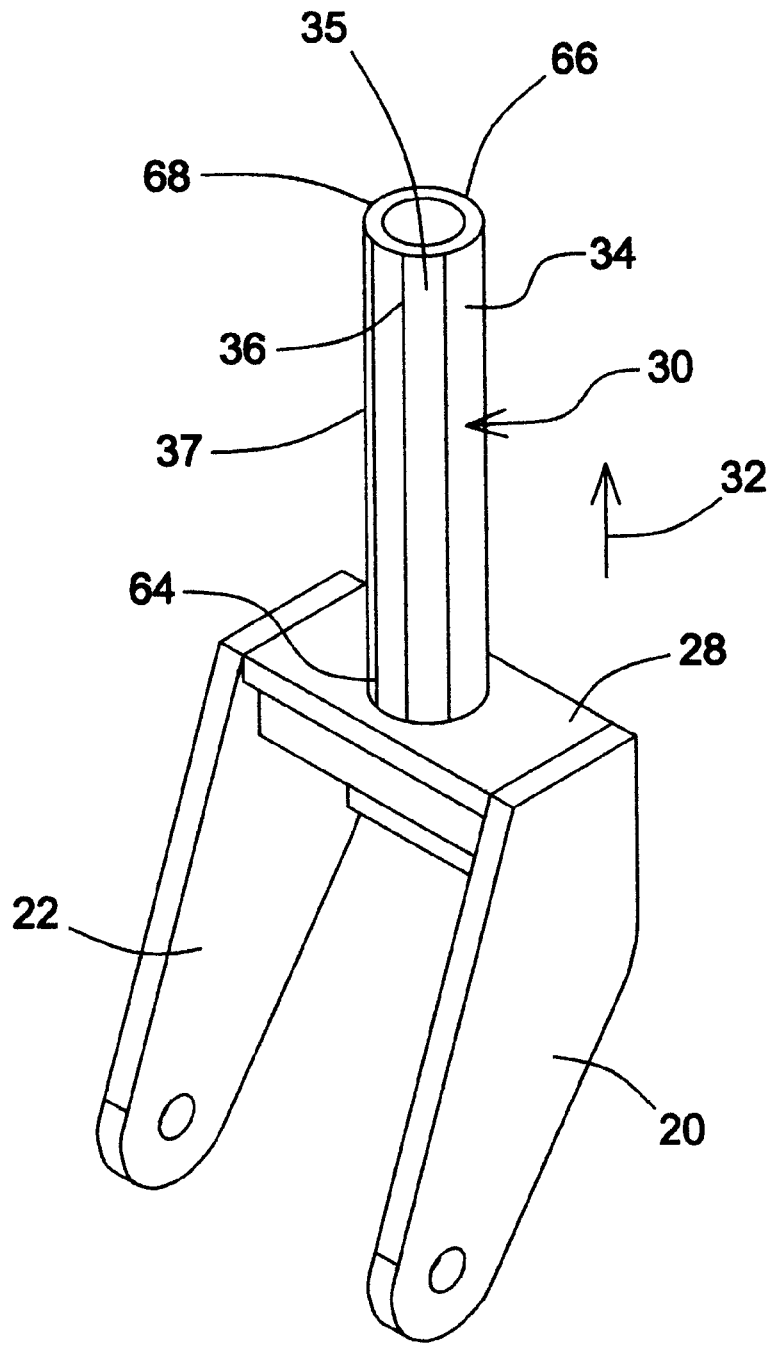
FIG. 3 is a perspective view of the forks and head of the apparatus shown in FIG. 1.

FIG. 3 is a perspective view of the forks 20 and 22 respectively. FIG. 3 shows a head generally designated 30 which is rigidly secured to the cross member 28. The head 30 extends from the cross member 28 in a direction as indicated by the arrow 32 away from the wheel 12. The head 30 defines a plurality of detents 34, 35, 36 and 37.

Figure 4:
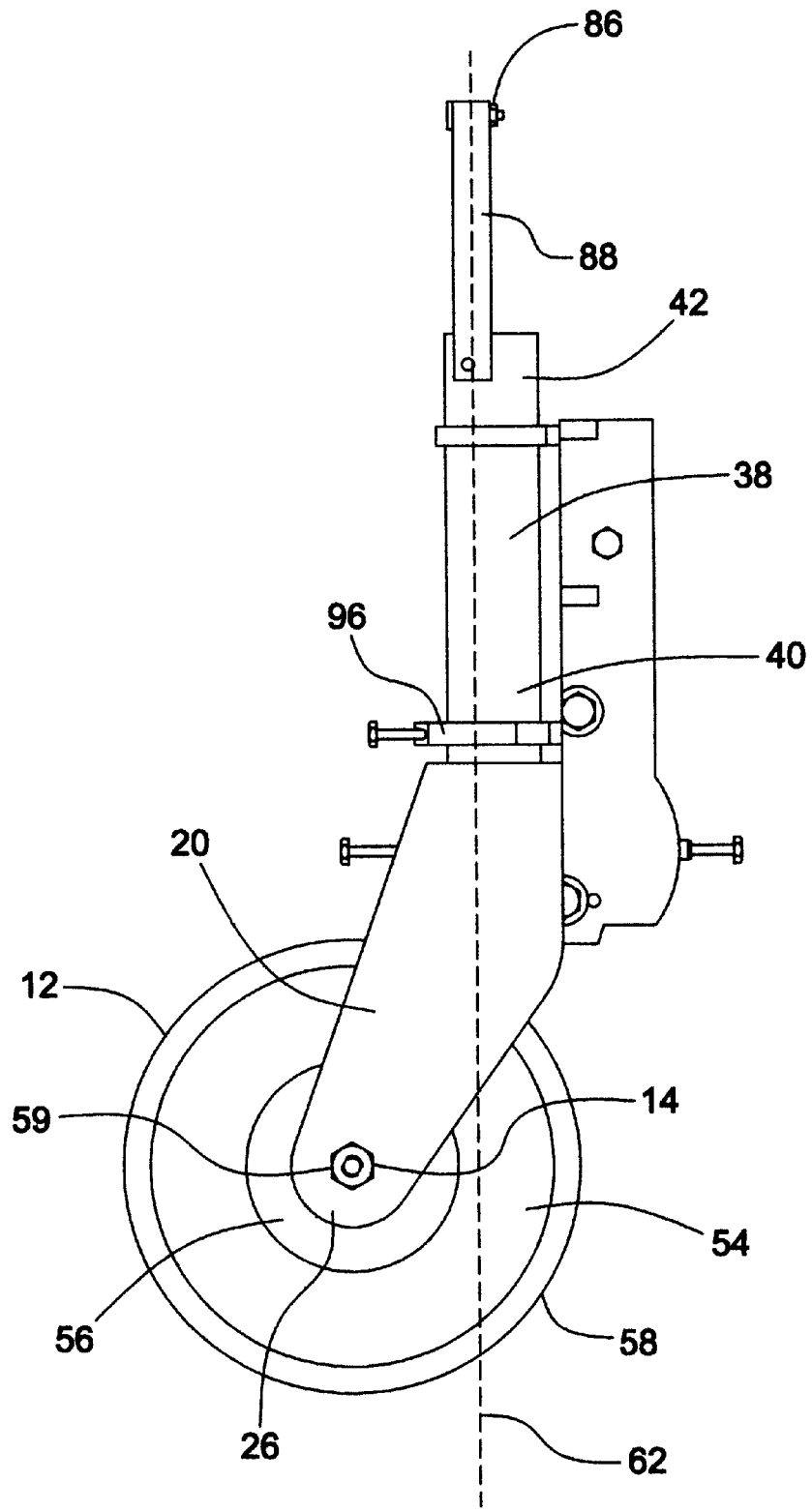
FIG. 4 is a view taken on the line 4—4 of FIG. 2.

FIG. 4 is a view taken on the line 4—4 of FIG. 2. FIG. 4 shows a tube 38 having a first and second extremity 40 and 42 respectively.

Figure 5:
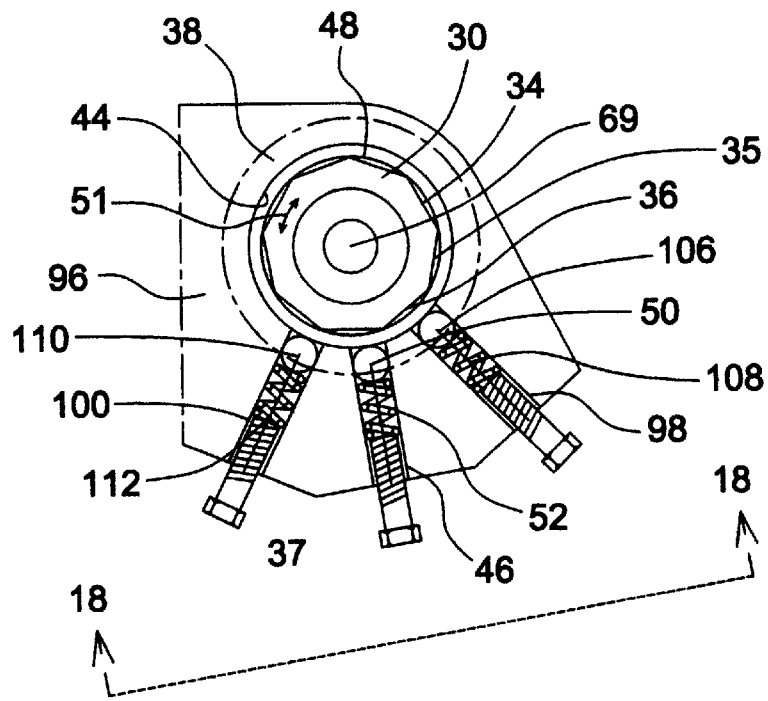
FIG. 5 is a sectional view taken on the line 5—5 of FIG. 2.

FIG. 5 is an enlarged sectional view taken on the line 5—5 of FIG. 2. As shown in FIG. 5 the tube 38 defines a bore 44 which extends between the extremities 40 and 42 shown in FIGS. 2 and 4 for the reception therein of the head 30. The tube 38 defines a first radial passageway 46 which is disposed in the vicinity of the detents 34–37. A flexible tubular lining 48 is disposed within the bore 44 of the tube 38, the lining 48 being disposed between the tube 38 and the head 30. A first member 50 is slidably disposed within the first passageway 46 with the first member 50 being disposed adjacent to the lining 48 such that the lining 48 is located between the first member 50 and one of the detents 34–37. Also, a first spring 52 is disposed within the first passageway 46 for biasing the first member 50 towards the one of the detents 34–37. The arrangement is such that an interaction of the first member 50 with the lining 48 permits controlled relative rotation of the head 30 as indicated by the arrow 51 within the tube 38 so that when the wheel 12 rotates about the axle 14, wobble of the wheel 12 and the forks 20 and 22 is inhibited, while the interaction permits rotation of the forks 20 and 22 relative to the tube 38 during turning and reversing of the plow.

Figure 6:
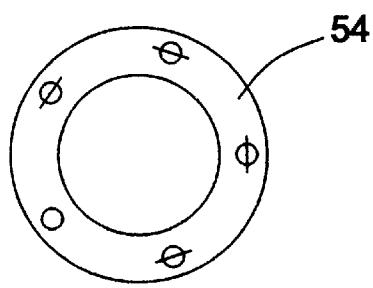
FIG. 6 is a side elevational view of the rim of the wheel of the apparatus shown in FIG. 1.
Figure 7:
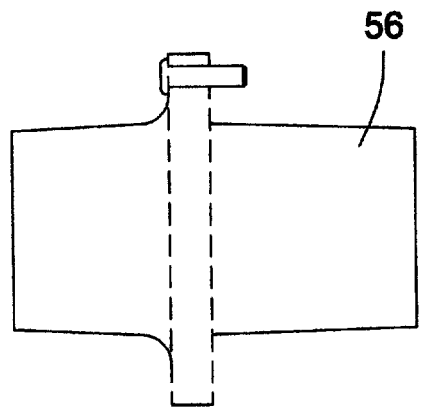
FIG. 7 is a front view of the hub of the wheel of the apparatus shown in FIG. 1.

In a more specific embodiment of the present invention, the wheel 12 includes a rim 54, shown in FIG. 6, the rim 54 being secured to a hub 56 shown in FIG. 7 for bearingly supporting the axle 14. A pneumatic tire 58 shown in FIG. 4 is mounted upon the rim 54.

As shown in FIG. 2, the axle 14 is threaded in the vicinity of the first end 16 thereof, the axle 14 further including a nut 59 and a bolt head 60. The nut 59 threadably cooperates with the end 16 of the axle 14 for securing the axle 14 to the distal ends 26 and 27 of the forks 20 and 22 respectively so that rotation of the wheel 12 about the axle 14 is permitted.

FIG. 8 is an enlarged front elevational view of the forks 20 and 22.

FIG. 9 is a view taken on line 9—9 of FIG. 8. FIGS. 8 and 9 show the distal ends 26 and 27 of the forks 20 and 22 are offset relative to a longitudinal axis 62 extending through the head 30 so that the axle 14 is offset relative to the head 30. Thus, in use of the plow, during turning and reversing, the axle 14 trails behind the longitudinal axis 62.

As shown in FIG. 8, the forks 20 and 22 are disposed spaced and parallel relative to each other for permitting rotation of the wheel 12 between the forks 20 and 22.

FIG. 10 is a view taken on the line 10—10 of FIG. 9. FIGS. 8–10 show the cross member 28 extending parallel and spaced relative to the axle 14.

As shown in FIGS. 8 and 9, the head 30 has a first and a second end 64 and 66, the first end 64 being rigidly secured to the cross member 28, the head 30 extending normal to the cross member 28. Also, as shown in FIG. 3, the head 30 defines a longitudinal hole 68 extending from the first end 64 to the second end 66 of the head 30.

Figure 11:
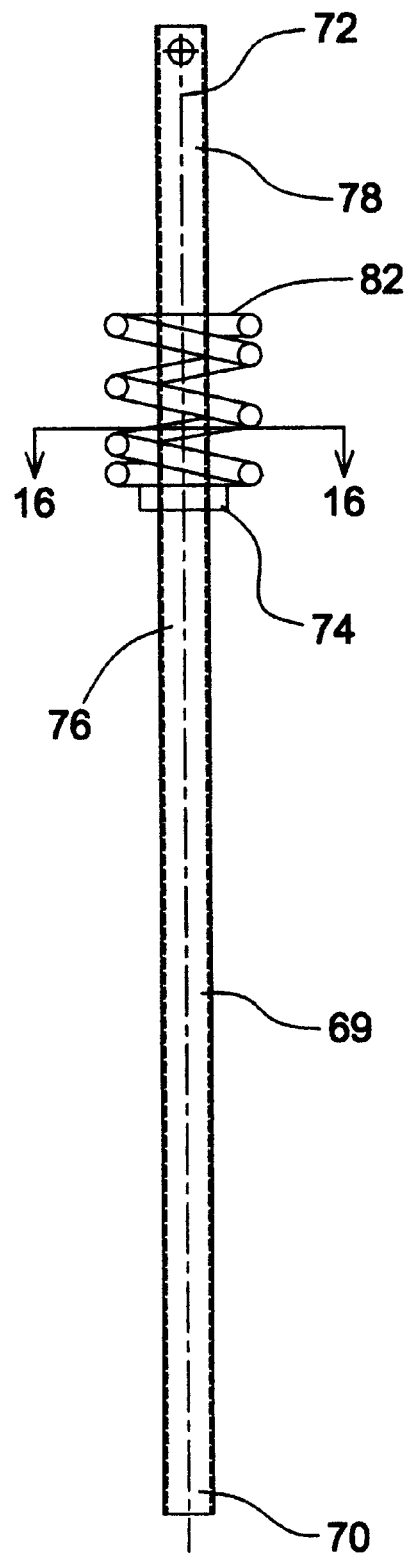
FIG. 11 is a side elevational view of the rod of the apparatus shown in FIG. 1.

FIG. 11 is a side elevational view of a threaded rod 69 which has a first and a second termination 70 and 72 respectively, the rod 69 extending through the hole 68 of the head 30.

As shown in FIG. 11, a collar 74 is secured to the rod 69 and extends radially therefrom, the collar 74 being disposed between the terminations 70 and 72 of the rod 69. The rod 69 defines a first portion 76 extending from the first termination 70 to the collar 74 and a second portion 78 extending from the collar 74 to the second termination 72.

A fastener 80 shown in FIG. 2 cooperates with the first termination 70 of the rod 69 such that when the rod 69 is inserted through the hole 68 of the head 30 and the collar 74 is located adjacent to the second end 66 of the head 30, the fastener 80 threadably cooperates with the first termination 70 for fastening the rod 69 relative to the head 30 so that the first portion 76 extends through the hole 68.

Figure 12:
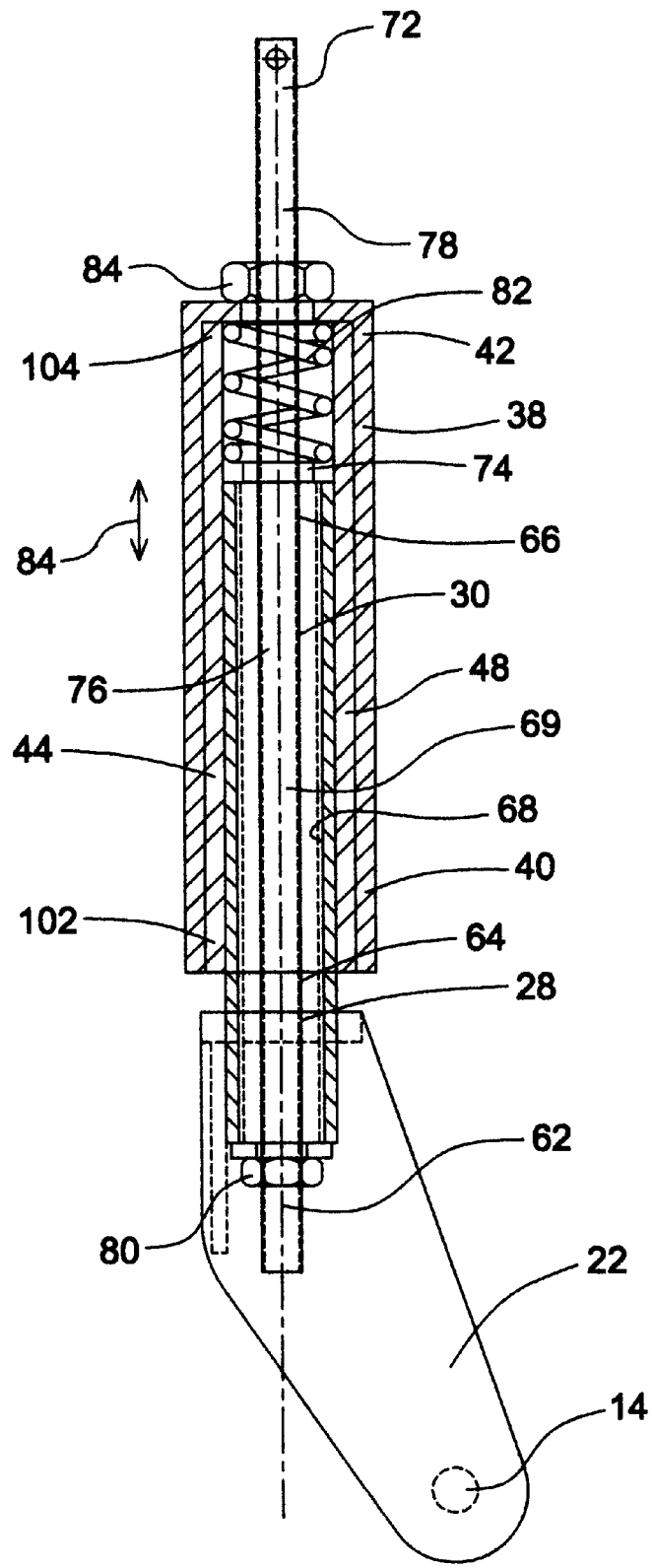
FIG. 12 is a view similar to that shown in FIG. 9 but with the rod and the tube of the apparatus shown in FIG. 1 connected together.
Figure 13:
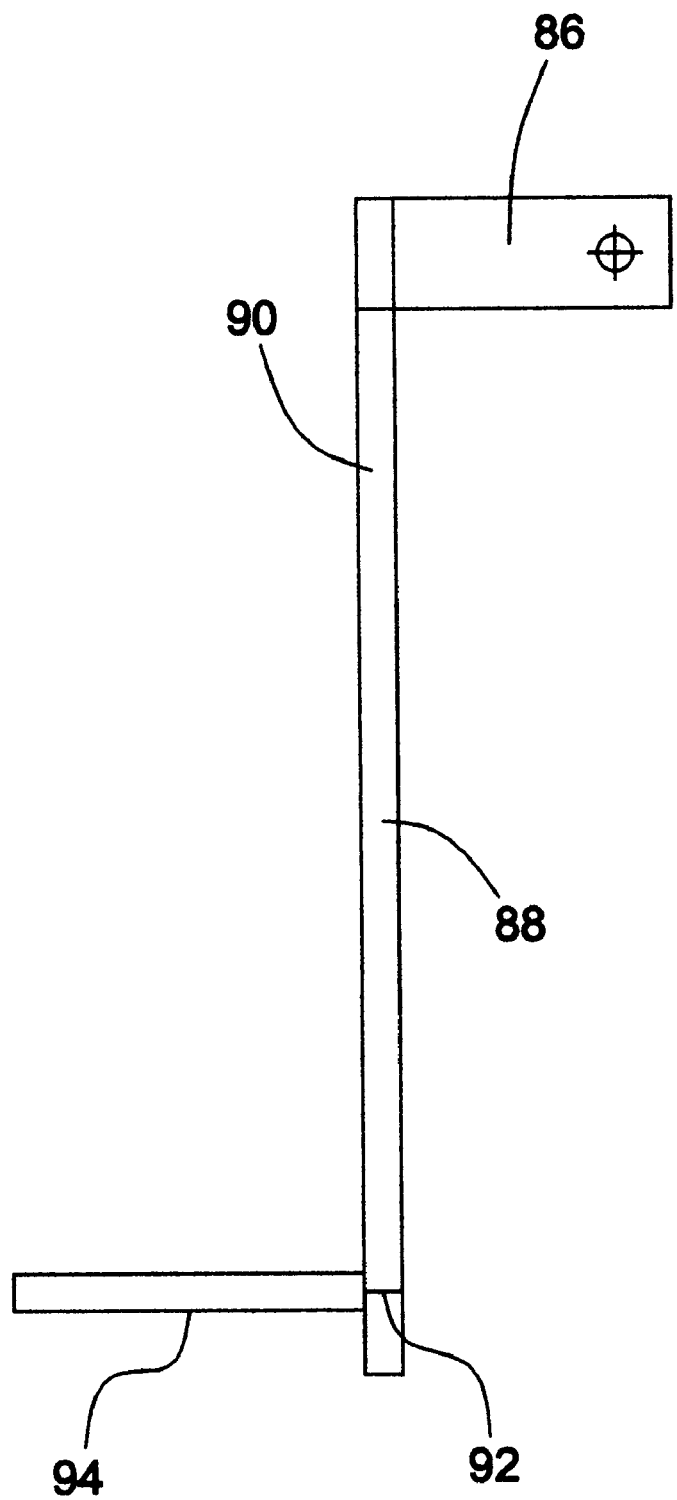
FIG. 13 is a view of the leverage arm of the apparatus shown in FIG. 1.

FIG. 12 is a view similar to that shown in FIG. 9 but shows the rod 69 with the first portion thereof 76 located within the hole 68 of the head 30. As shown in FIG. 12, a spring 82 cooperates with the second portion 78 of the rod 69, the second portion 78 of the rod 69 extending through the spring 82 such that the spring 82 is disposed between the collar 74 and the second extremity 42 of the tube 38. The arrangement is such that axial movement of the head 30 relative to the tube 38 as indicated by the arrow 84 is controlled by the spring 82.

As shown in FIGS. 3 and 5, the head 30 is of cylindrical prismatic configuration, the head 30 defining a plurality of flat faces 34–37 which constitute the plurality of detents 34–37. Each one of the flat faces 34–37 has the same dimensions.

As shown in FIG. 12, the second extremity 42 of the tube 38 permits the passage therethrough of the second portion 78 of the rod 69.

A threaded member 84 cooperates with the threaded second portion 78 of the rod 69 for adjusting and limiting axial movement of the head 30 within the tube 38. The spring 82 thus permits limited movement of the collar 74 towards the second extremity 42 of the tube 38 so that the wheel 12, forks 20 and 22 and head 30 are permitted to move axially as indicated by the arrow 84 within the bore 44 thereby providing limited sprung suspension of the wheel 12.

As shown in FIGS. 1, 2, 4 and 13 a yoke 86 is pivotally fastened to the second termination 72 of the rod 69. Additionally, a leverage arm 88 has a first and a second end 90 and 92 respectively, the first end 90 being secured to the yoke 86 such that the arm 88 extends from the yoke 86.

Figure 14:
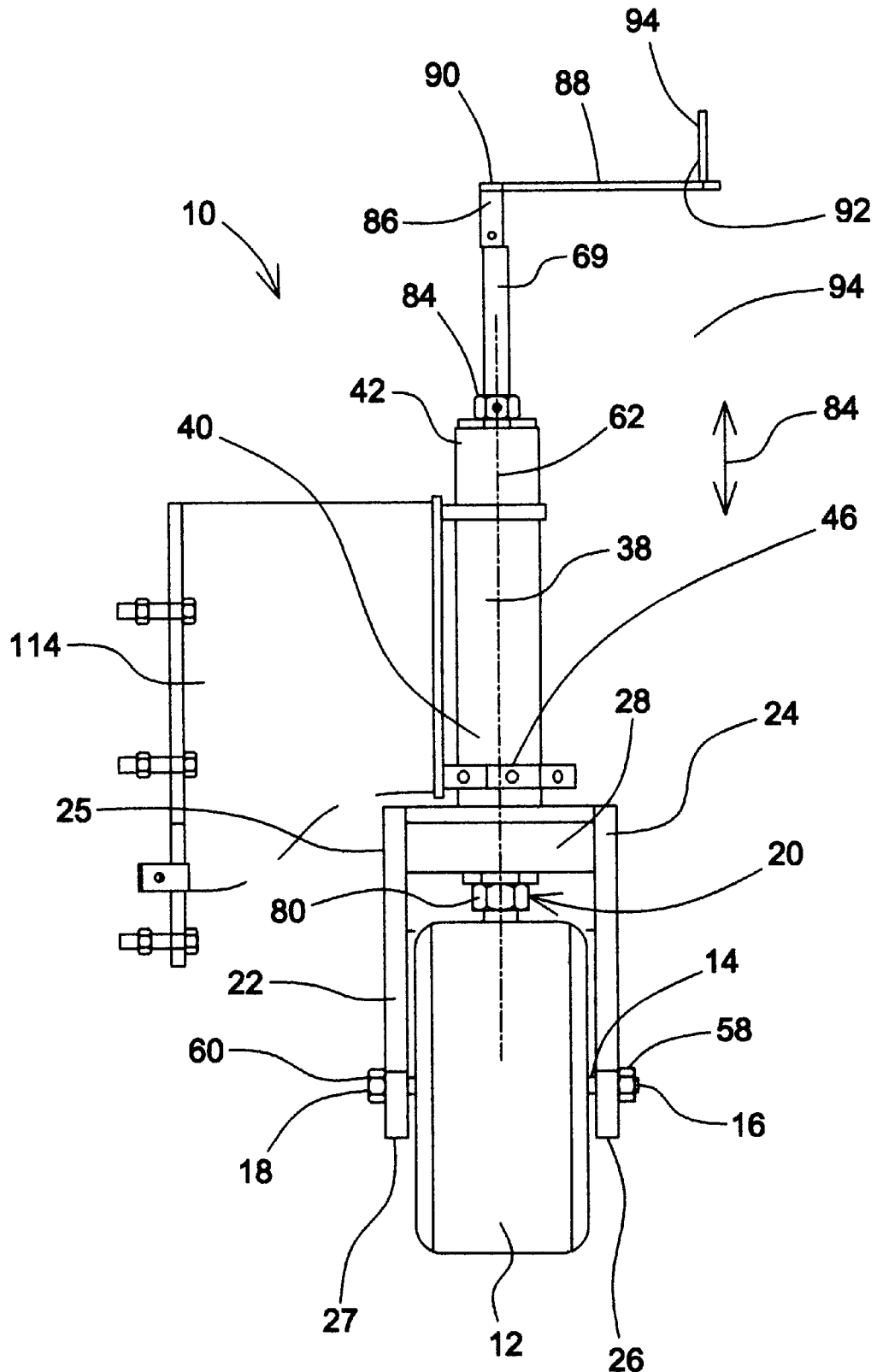
FIG. 14 is a view similar to that shown in FIG. 2 but showing the leverage arm in a first location thereof.

FIG. 14 is a similar view to that shown in FIG. 2 but shows a locator 94 secured to the second end 92 of the arm 88, the arrangement being such that when the arm 88 is disposed in a first location thereof as shown in FIG. 14 with the locator 94 disposed away from the tube 38, rotation of the locator 94 about a longitudinal axis 62 of the head 30 rotates the rod 69 so that the rod 69 is moved axially relative to the fastener 80 for adjusting a compression of the spring 82 disposed between the collar 74 and the second extremity 42 of the tube 38 as shown in FIG. 12. When the arm 88 is disposed in a second location thereof as shown in FIG. 2 with the locator 94 disposed adjacent to the tube 38, a clip 93 shown in FIG. 15 on the second extremity 42 of the tube 38 and the locator 94 cooperate together to lock the locator 94 against rotation thereof.

Figure 15:
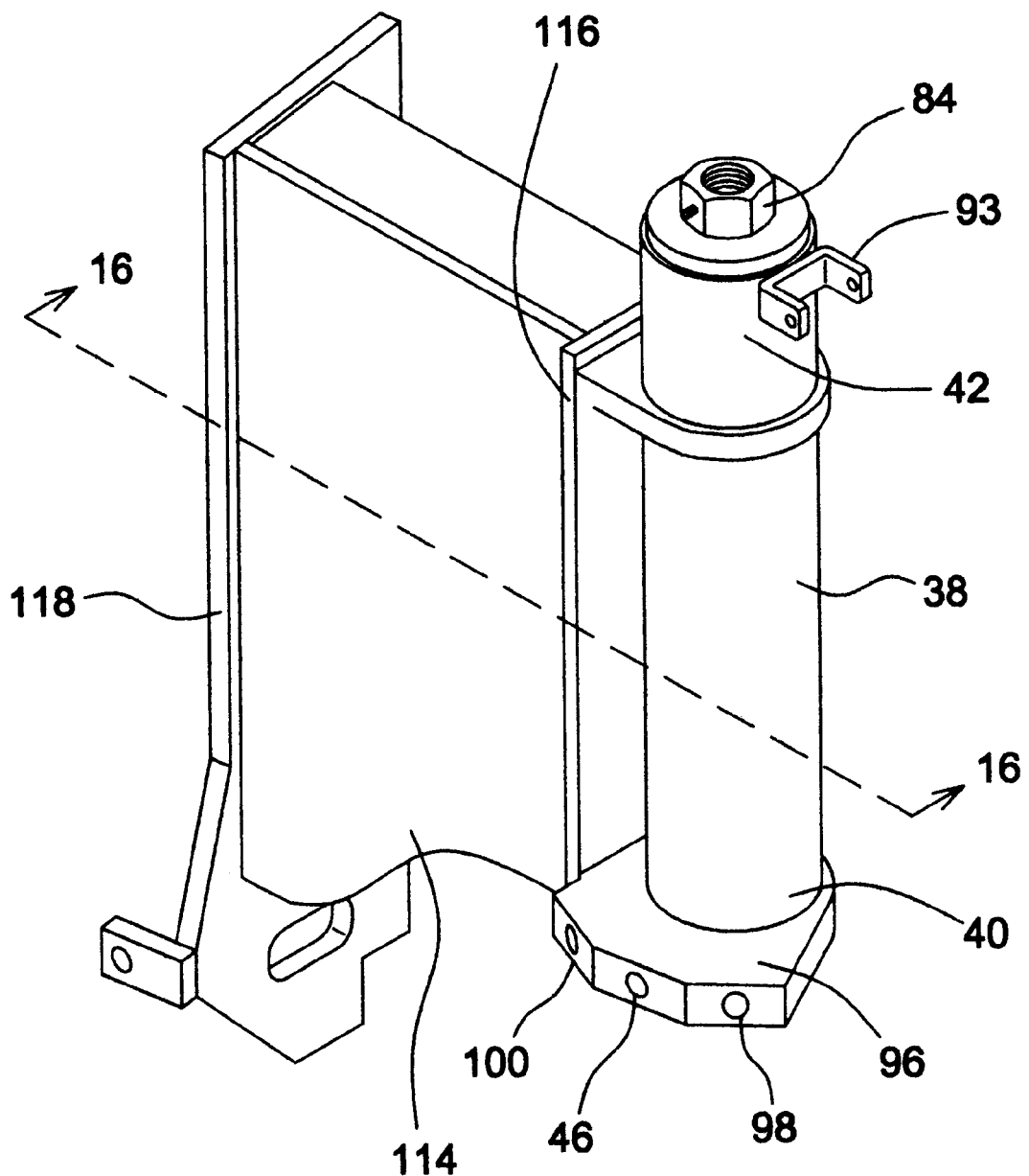
FIG. 15 is a perspective view of the tube of the apparatus shown in FIG. 1.

FIG. 15 is a perspective view of the tube 38. As shown in FIG. 15, the first extremity 40 of the tube 38 includes a radial plate 96 which extends radially outward from the first extremity 40 of the tube 38. The plate 96 defines a second and a third radial passageway 98 and 100 respectively, the arrangement being such that the first, second and third passageways 46, 98 and 100 are defined by the plate 96 and the first extremity 40 of the tube 38. The passageways 46, 98 and 100 are coplanar and are spaced relative to each other around the first extremity 40 of the tube 38.

As shown in FIG. 12, the lining 48 has a first and a second end 102 and 104 respectively. The first end 102 is located adjacent to the first extremity 40 of the tube 38, and the second end 104 is located adjacent to the second extremity 42 of the tube 38. The arrangement is such that regardless of an axial disposition of the head 30 within the bore 44 of the tube 38, the lining 48 is always disposed between the first member 50 and one of the detents 34–37.

Figure 16:
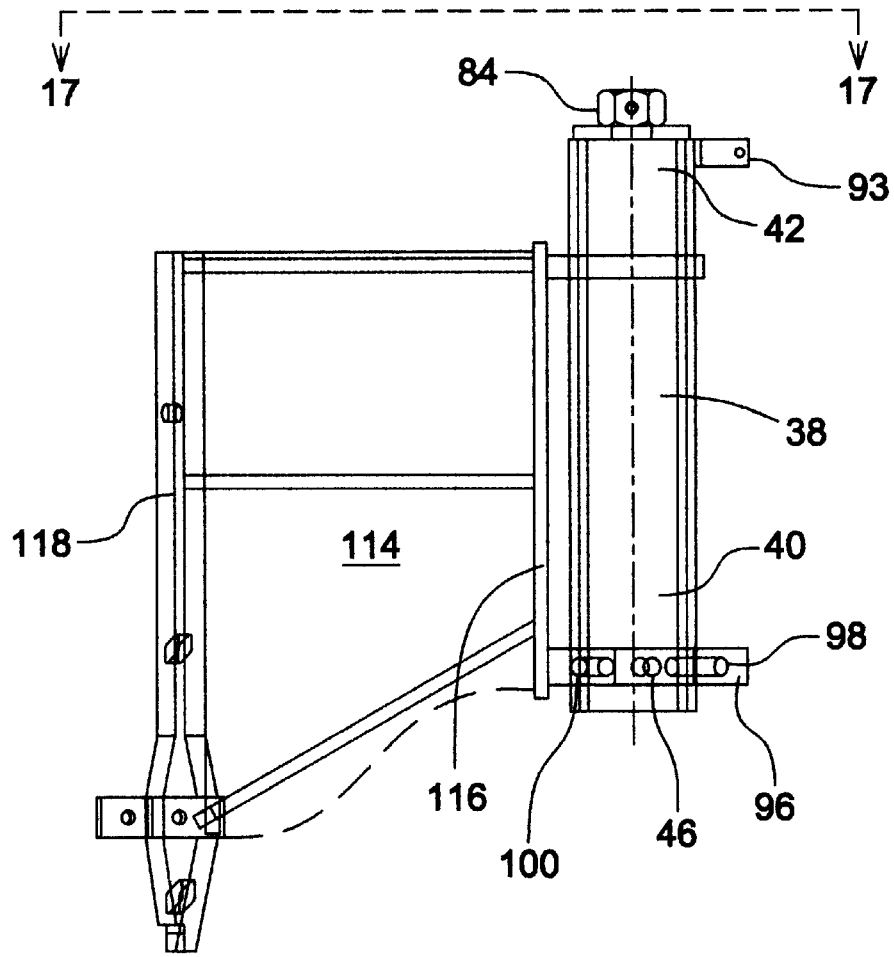
FIG. 16 is a view taken on the line 16—16 of FIG. 15.
Figure 17:
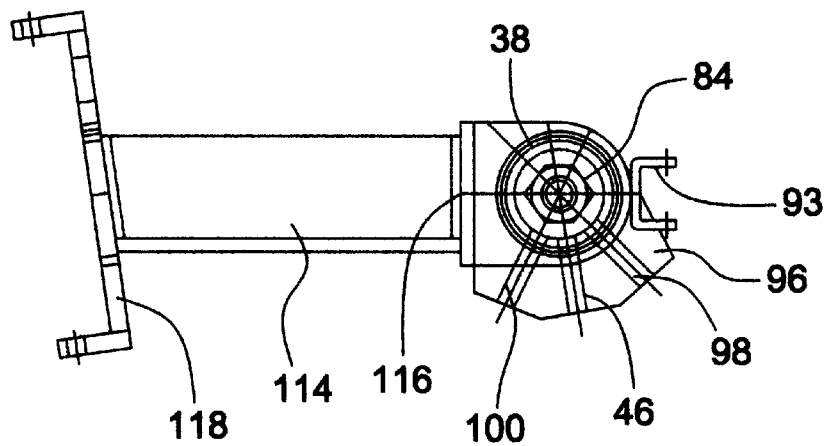
FIG. 17 is a view taken on the line 17—17 of FIG. 16.
Figure 18:
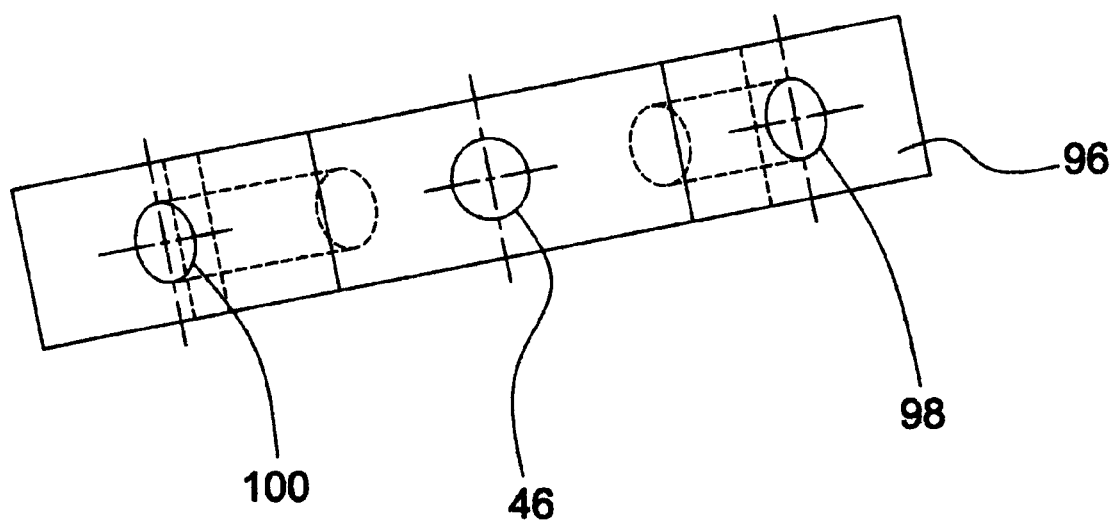
FIG. 18 is a view taken on the line 18—18 of FIG. 5.

FIG. 16 is a view taken on the line 16—16 of FIG. 15. FIG. 17 is a view taken on the line 17—17 of FIG. 16, and FIG. 18 is a view taken on the line 18—18 of FIG. 5. As shown in FIGS. 5, 16, 17 and 18, a second member 106 is slidably disposed within the second passageway 98. A second biasing means 108 is disposed within the second passageway 98 for urging the second member 106 towards the lining 48.

As shown in FIG. 5, a third member 110 is slidably disposed within the third passageway 100. A third biasing means 112 is disposed within the third passageway 100 for urging the third member 110 towards the lining 48, the arrangement being such that an interaction of the first, second and third members 50, 106 and 110 respectively with the lining 48 permits movement of the lining 48 towards a respective detent 34–37 for controlling relative rotation of the head 30 within the bore 44 of the tube 38 so that when the wheel 12 rotates about the axle 14, wobbling of the wheel 12 and the forks 20 and 22 is inhibited, while the interaction permits rotation of the forks 20 and 22 relative to the tube 38 during turning and reversing of the plow.

The first, second and third members 50, 106 and 110 are respectively a first, second and a third ball as shown in FIG. 5.

As shown in FIGS. 16 and 17, an attachment member 114 has a first and a second side 116 and 118 respectively, the first side 116 being secured to the tube 38, the second side 118 being secured to the plow.

In operation of the apparatus 10, the single wheel 12 supports the plow and permits the plow to be moved relative to the ground at higher speeds when compared to the prior art dual wheel arrangements.

Also, when the moldboard is reversed the aforementioned single wheel does not wobble but rather permits a smooth transition of a moldboard relative to the runway even when such reversal is made at relatively high speeds of up to 60 mph.

Additionally, when the apparatus 10 is moved backwards along the runway, the single wheel 12 and forks 20 and 22 rotate automatically through 180 degrees without any tendency to wobble.

In summary, the present invention permits movement of the airport plow apparatus along an airport runway while inhibiting any tendency of the apparatus to wobble relative to the runway.

What is claimed is:

1. A single wheel caster apparatus for supporting a plow, said apparatus comprising:

a wheel;

an axle having a first and a second end, said axle extending through said wheel such that said wheel is rotatably supported by said axle;

a first and a second fork, each fork having a proximal and a distal end, said distal end of said first fork supporting said first end of said axle, said distal end of said second fork supporting said second end of said axle;

a cross member extending between said proximal ends of said forks;

a head rigidly secured to said cross member and extending therefrom in a direction away from said wheel, said head defining a plurality of detents;

a tube having a first and second extremity, said tube defining a bore extending between said extremities for the reception therein of said head, said tube defining a first radial passageway disposed in the vicinity of said detents;

a flexible tubular lining disposed within said bore of said tube, said lining being disposed between said tube and said head;

a first member slidably disposed within said first passageway, said first member being disposed adjacent to said lining such that said lining is located between said first member and one of said detents; and first biasing means disposed within said first passageway for biasing said first member towards said one of said detents, the arrangement being such that an interaction of said first member with said lining permits controlled relative rotation of said head within said tube so that when said wheel rotates about said axle, wobble of said wheel and said forks is inhibited, while said interaction permits rotation of said forks relative to said tube during turning and reversing of said plow.

2. A single wheel caster apparatus as set forth in claim 1 wherein said wheel includes:
   a rim;
   a hub secured to said rim, said hub bearingly supporting said axle;
   a pneumatic tire mounted upon said rim.

3. A single wheel caster apparatus as set forth in claim 1 wherein
   said axle is threaded in the vicinity of said first end thereof;
   said axle further including:
   a nut which threadably cooperates with said first end of said axle for securing said axle to said distal ends of said forks so that rotation of said wheel about said axle is permitted.

4. A single wheel caster apparatus as set forth in claim 1 wherein
   said distal ends of said forks are offset relative to a longitudinal axis extending through said head so that said axle is offset relative to said head such that in use of said plow, during said turning and reversing thereof, said axle is trailing behind said longitudinal axis.

5. A single wheel caster apparatus as set forth in claim 1 wherein
   said forks are disposed spaced and parallel relative to each other for permitting rotation of said wheel between said forks.

6. A single wheel caster apparatus as set forth in claim 1 wherein
   said cross member extends parallel and spaced relative to said axle.

7. A single wheel caster apparatus as set forth in claim 1 wherein
   said head has a first and a second end, said first end being rigidly secured to said cross member, said head extending normal to said cross member, said head defining a longitudinal hole extending from said first to said second end.

8. A single wheel caster apparatus as set forth in claim 7 further including:
   a threaded rod having a first and a second termination, said rod extending through said hole;
   a collar secured to said rod and extending radially therefrom, said collar being disposed between said terminations of said rod so that said rod defines a first portion extending from said first termination to said collar and a second portion extending from said collar to said second termination;
   a fastener cooperating with said first termination of said rod such that when said rod is inserted through said hole and said collar is located adjacent to said second end of said head, said fastener readably cooperates with said first termination for fastening said rod relative to said head so that said first portion extends through said hole.

9. A single wheel caster apparatus as set forth in claim 8 further including:
   a spring cooperating with said second portion, said second portion of said rod extending through said spring such that said spring is disposed between said collar and said second extremity of said tube, the arrangement being such that axial movement of said head relative to said tube is controlled by said spring.

10. A single wheel caster apparatus as set forth in claim 1 wherein
    said head is of cylindrical prismatic configuration, said head defining a plurality of flat faces which constitute said plurality of detents.

11. A single wheel caster apparatus as set forth in claim 1 wherein
    each of said flat faces has the same dimensions.

12. A single wheel caster apparatus as set forth in claim 9 wherein
    said second extremity of said tube permits the passage therethrough of said second portion of said rod;
    a threaded member cooperating with said threaded second portion of said rod for limiting axial movement of said head within said tube, said spring permitting limited movement of said collar towards said second extremity of said tube so that said wheel, forks and head are permitted to move axially within said bore thereby providing limited sprung suspension of said wheel.

13. A single wheel caster apparatus as set forth in claim 12 further including:
    a yoke pivotally fastened to said second termination of said rod;
    a leverage arm having a first and a second end, said first end being secured to said yoke such that said arm extends from said yoke;
    a locator secured to said second end of said arm, the arrangement being such that when said arm is disposed in a first location thereof with said locator disposed away from said tube, rotation of said locator about a longitudinal axis of said head rotates said rod so that said rod is moved axially relative to said fastener for adjusting a compression of said spring disposed between said collar and said second extremity of said tube and when said arm is disposed in a second location thereof with said locator disposed adjacent to said tube, said second extremity of said tube and said locator cooperate together to lock said locator against rotation thereof.

14. A single wheel caster apparatus as set forth in claim 1 wherein
    said first extremity of said tube includes:
    a radial plate which extends radially outwards from said first extremity of said tube, said plate defining a second and a third radial passageway, the arrangement being such that said first, second and third passageways are defined by said plate and said first extremity of said tube, said passageways being coplanar relative to each other and spaced relative to each other around said second extremity of said tube.

15. A single wheel caster apparatus as set forth in claim 1 wherein
    said lining has a first and a second end, said first end being located adjacent to said first extremity of said tube, said second end being located adjacent to said second extremity of said tube, the arrangement being such that regardless of an axial disposition of said head within said bore of said tube, said lining is always disposed between said first member and one of said detents.

16. A single wheel caster apparatus as set forth in claim 14 further including:
    a second member slidably disposed within said second passageway;
    a second biasing means disposed within said second passageway for urging said second member towards said lining;

a third member slidably disposed within said third passageway;

a third biasing means disposed within said third passageway for urging said third member towards said lining, the arrangement being such that an interaction of said first, second and third members with said lining permits movement of said lining towards a respective detent for controlling relative rotation of said head within said bore of said tube so that when said wheel rotates about said axle, wobbling of said wheel and said forks is inhibited, while said interaction permits rotation of said forks relative to said tube during turning and reversing of said plow.

17. A single wheel caster apparatus as set forth in claim 1 wherein said first, second and third members are respectively a first, second and a third ball.

18. A single wheel caster apparatus as set forth in claim 1 further including:

an attachment member having a first and a second side, said first side being secured to said tube, said second side being secured to the plow.

19. A single wheel caster apparatus for supporting a plow, said apparatus comprising:

a wheel;

an axle having a first and a second end, said axle extending through said wheel such that said wheel is rotatably supported by said axle;

a first and a second fork, each fork having a proximal and a distal end, said distal end of said first fork supporting said first end of said axle, said distal end of said second fork supporting said second end of said axle;

a cross member extending between said proximal ends of said forks;

a head rigidly secured to said cross member and extending therefrom in a direction away from said wheel, said head defining a plurality of detents;

a tube having a first and second extremity, said tube defining a bore extending between said extremities for the reception therein of said head, said tube defining a first radial passageway disposed in the vicinity of said detents;

a flexible tubular lining disposed within said bore of said tube, said lining being disposed between said tube and said head;

a first member slidably disposed within said first passageway, said first member being disposed adjacent to said lining such that said lining is located between said first member and one of said detents;

first biasing means disposed within said first passageway for biasing said first member towards said one of said detents, the arrangement being such that an interaction of said first member with said lining permits controlled relative rotation of said head within said tube so that when said wheel rotates about said axle, wobble of said wheel and said forks is inhibited, while said interaction permits rotation of said forks relative to said tube during turning and reversing of said plow; and said distal ends of said forks being offset relative to a longitudinal axis extending through said head so that said axle is offset relative to said head such that in use of said plow, during said turning and reversing thereof, said axle is trailing behind said longitudinal axis.

20. A single wheel caster apparatus for supporting a plow, said apparatus comprising:

a wheel;

an axle having a first and a second end, said axle extending through said wheel such that said wheel is rotatably supported by said axle;

a first and a second fork, each fork having a proximal and a distal end, said distal end of said first fork supporting said first end of said axle, said distal end of said second fork supporting said second end of said axle;

a cross member extending between said proximal ends of said forks;

a head rigidly secured to said cross member and extending therefrom in a direction away from said wheel, said head defining a plurality of detents;

said head being of cylindrical prismatic configuration so that said head defines a plurality of flat faces which constitute said plurality of detents;

a tube having a first and second extremity, said tube defining a bore extending between said extremities for the reception therein of said head, said tube defining a first radial passageway disposed in the vicinity of said detents;

a flexible tubular lining disposed within said bore of said tube, said lining being disposed between said tube and said head;

a first member slidably disposed within said first passageway, said first member being disposed adjacent to said lining such that said lining is located between said first member and one of said detents; and first biasing means disposed within said first passageway for biasing said first member towards said one of said detents, the arrangement being such that an interaction of said first member with said lining permits controlled relative rotation of said head within said tube so that when said wheel rotates about said axle, wobble of said wheel and said forks is inhibited, while said interaction permits rotation of said forks relative to said tube during turning and reversing of said plow.

* * * * *

UNITED STATES PATENT AND TRADEMARK OFFICE
CERTIFICATE OF CORRECTION

PATENT NO. : 6,094,846
DATED : November 11, 1999
INVENTOR(S) : Feller

Page 1 of 1

It is certified that error appears in the above-identified patent and that said Letters Patent is hereby corrected as shown below:

Column 7,
Line 56, "readably" should be "threadably".

Signed and Sealed this

Twenty-fifth Day of September, 2001

Attest:

*Nicholas P. Godici*

NICHOLAS P. GODICI
*Attesting Officer*     *Acting Director of the United States Patent and Trademark Office*